United States Patent
Trindade et al.

(10) Patent No.: US 6,777,113 B2
(45) Date of Patent: Aug. 17, 2004

(54) MULTILAYER FILMS FOR OPTIMIZED SOFT UNDERLAYER MAGNETIC PROPERTIES OF DUAL LAYER PERPENDICULAR RECORDING MEDIA

(75) Inventors: Isabel G. Trindade, Setubal (PT); Sharat Batra, Wexford, PA (US); Dieter K. Weller, Gibsonia, PA (US); Yukiko Kubota, Pittsburgh, PA (US); Kurt W. Wierman, Pittsburgh, PA (US); James K. Howard, Pittsburgh, PA (US); Ganping Ju, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/116,577

(22) Filed: Apr. 4, 2002

(65) Prior Publication Data

US 2003/0035973 A1 Feb. 20, 2003

Related U.S. Application Data

(60) Provisional application No. 60/312,173, filed on Aug. 14, 2001.

(51) Int. Cl.[7] ............................................. G11B 5/667
(52) U.S. Cl. ........................ 428/694 TM; 428/694 EC
(58) Field of Search ................... 428/691 TM (56) References Cited

U.S. PATENT DOCUMENTS

| | | |
|---|---|---|
| 4,687,712 A * | 8/1987 | Sugita et al. ............... 428/611 |
| 5,447,781 A | 9/1995 | Kano et al. |
| 5,465,185 A | 11/1995 | Heim et al. |
| 5,830,569 A | 11/1998 | Hikosaka et al. |
| 5,830,590 A | 11/1998 | Gooch et al. |
| 5,895,712 A | 4/1999 | Chen et al. |
| 5,900,324 A | 5/1999 | Moroishi et al. |
| 6,001,447 A | 12/1999 | Tanahashi et al. |
| 6,090,480 A | 7/2000 | Hayashi |
| 6,228,515 B1 | 5/2001 | Shin et al. |
| 6,261,681 B1 | 7/2001 | Suekane et al. |
| 6,270,885 B1 | 8/2001 | Hokkyo et al. |
| 2002/0028357 A1 * | 3/2002 | Shukh et al. ......... 428/694 TM |
| 2003/0035973 A1 * | 2/2003 | Trindade et al. ............ 428/494 |

* cited by examiner

*Primary Examiner*—Deborah Jones
*Assistant Examiner*—Vivek Koppikar
(74) *Attorney, Agent, or Firm*—Benjamin T. Queen, II, Esq.; Pietragallo, Bosick & Gordon (57) ABSTRACT

A perpendicular magnetic recording medium includes a hard magnetic recording layer and a soft magnetic underlayer adjacent the hard magnetic recording layer. The soft magnetic underlayer includes first and second ferromagnetically coupled multilayer structures and a coupling layer positioned between the first and second multilayer structures for antiferromagnetically coupling the first and second multilayer structures. A magnetic disc drive storage system incorporating such a perpendicular magnetic recording medium and a method of making such a perpendicular magnetic recording medium are also included.

17 Claims, 5 Drawing Sheets

MULTILAYER FILMS FOR OPTIMIZED SOFT UNDERLAYER MAGNETIC PROPERTIES OF DUAL LAYER PERPENDICULAR RECORDING MEDIA

CROSS REFERENCE TO RELATED APPLICATION

This application claims the benefit of U.S. Provisional Application No. 60/312,173 filed Aug. 14, 2001.

FIELD OF THE INVENTION

The invention relates to perpendicular magnetic recording media, and more particularly, relates to a soft magnetic underlayer of such media.

BACKGROUND OF THE INVENTION

Perpendicular magnetic recording systems have been developed for use in computer hard disc drives. A typical perpendicular recording head includes a trailing write pole, a leading return or opposing pole magnetically coupled to the write pole, and an electrically conductive magnetizing coil surrounding the yoke of the write pole. Perpendicular recording media may include a hard magnetic recording layer with vertically oriented magnetic domains and a soft magnetic underlayer to enhance the recording head fields and provide a flux path from the trailing write pole to the leading or opposing pole of the writer. Such perpendicular recording media may also include a thin interlayer between the hard recording layer and the soft underlayer to prevent exchange coupling between the hard and soft layers.

To write to the magnetic recording medium, the recording head is separated from the magnetic recording medium by a distance known as the flying height. The magnetic recording medium is moved past the recording head so that the recording head follows the tracks of the magnetic recording medium, with the magnetic recording medium first passing under the opposing pole and then passing under the write pole. Current is passed through the coil to create magnetic flux within the write pole. The magnetic flux passes from the write pole tip, through the hard magnetic recording track, into the soft underlayer, and across to the opposing pole.

In addition, the soft underlayer helps during the read operation. During the read back process, the soft underlayer produces the image of magnetic charges in the magnetically hard layer, effectively increasing the magnetic flux coming from the medium. This provides a higher playback signal.

Perpendicular recording designs have the potential to support much higher linear densities than conventional longitudinal designs due to a reduced demagnetizing field in the recording transitions. In addition, the described bilayer medium is used in perpendicular recording to allow increased efficiency of the recording head. The soft magnetic underlayer of the perpendicular recording medium forms inverse image charges and substantially magnifies both the write field during recording and the fringing field of the recorded transition during reproduction. The quality of the image, and therefore the effectiveness of the soft underlayer, depends upon the permeability of the soft underlayer.

To support the high image efficiency, the soft underlayer should be in an unsaturated state. However, during recording a top portion of the soft underlayer is likely to be saturated. Therefore, thickness and magnetic saturation induction, $B_s$, of the soft underlayer needs to be matched to appropriate parameters of the recording head. Magnetic saturation of the soft underlayer causing the permeability reduction will result in write field degradation. Therefore, the soft underlayer should be relatively thick and have a high magnetic saturation induction, e.g. $B_s>1$ Tesla.

However, one of the challenges of implementing perpendicular recording is to resolve the problem of soft underlayer noise. The noise may be caused by fringing fields generated by magnetic domains, or uncompensated magnetic charges, in the soft underlayer that can be sensed by the reader. For example, soft underlayer materials, such as $Ni_{80}Fe_{20}$ or $Co_{90}Fe_{10}$, may exhibit multi-domain states that produce noise enhancement in the read-back signals, hence, degrading the signal-to-noise (SNR) ratio. If the magnetic domain distribution of such materials is not carefully controlled, very large fringing fields can introduce substantial amounts of noise in the read element. Not only can the reader sense the steady state distribution of magnetization in the soft underlayer, but it can also affect the distribution of magnetization in the soft underlayer, thus generating time dependent noise. Both types of noise should be minimized.

In addition, magnetostatic interaction between the soft underlayer and the hard layer can degrade SNR ratio and reduce linear density.

There is identified a need for perpendicular magnetic recording media with a soft magnetic underlayer that overcomes limitations, disadvantages, or shortcomings of known perpendicular magnetic recording media.

SUMMARY OF THE INVENTION

The invention meets the identified need, as well as other needs, as will be more fully understood following a review of this specification and drawings.

In accordance with an aspect of the invention, a perpendicular magnetic recording medium comprises a hard magnetic recording layer and a soft magnetic underlayer under the hard magnetic recording layer. The soft magnetic underlayer comprises a first ferromagnetically coupled multilayer structure and a second ferromagnetically coupled multilayer structure. The soft underlayer also includes a coupling layer that is positioned between the first and second multilayer structures for antiferromagnetically coupling the multilayer structures to one another. Each multilayer structure may include first and second magnetic layers that are ferromagnetically coupled by an interlayer positioned therebetween. Each multilayer structure may include additional magnetic layers with interlayers positioned therebetween.

In accordance with yet another aspect of the invention, a magnetic disc drive storage system comprises a housing, a perpendicular magnetic recording medium positioned in the housing and a movable recording head mounted in the housing adjacent the perpendicular magnetic recording medium. The perpendicular magnetic recording medium comprises a hard magnetic recording layer and a soft magnetic underlayer under the hard magnetic recording layer. The soft magnetic underlayer includes a first ferromagnetically coupled multilayer structure, a second ferromagnetically coupled multilayer structure, and a coupling layer positioned therebetween for antiferromagnetically coupling the first and second ferromagnetically coupled multilayer structures.

In accordance with another aspect of the invention, a perpendicular magnetic recording medium comprises a hard magnetic recording layer and a soft magnetic layer under the hard magnetic recording layer. The soft magnetic underlayer includes a plurality of magnetic layers and a plurality of interlayers individually interposed between each of the plurality of magnetic layers in order to antiferromagnetically couple each of the plurality of magnetic layers successively.

In accordance with a further aspect of the invention, a method of making a laminated magnetically soft underlayer of a perpendicular magnetic recording medium is provided. The method includes depositing a first ferromagnetically coupled multilayer structure on a substrate. The method also includes depositing a coupling layer on the first ferromagnetically coupled multilayer structure. The method also includes depositing a second ferromagnetically coupled multilayer structure on the coupling layer, wherein the coupling layer serves to antiferromagnetically couple the first and second multilayer structures. The step of depositing the first ferromagnetically coupled multilayer structure on a substrate may include depositing an interlayer on the substrate, depositing a magnetic layer on the interlayer, depositing an additional interlayer on the magnetic layer, and depositing an additional magnetic layer on the additional interlayer. The step of depositing a second multilayer structure on the coupling layer may include depositing a magnetic layer on the coupling layer, depositing an interlayer on the magnetic layer, depositing an additional magnetic layer on the interlayer, and depositing an additional interlayer on the additional magnetic layer.

DETAILED DESCRIPTION OF THE INVENTION

The invention provides a perpendicular recording medium with ferromagnetic and antiferromagnetic coupling in a soft magnetic underlayer of the perpendicular recording medium. The invention is particularly suitable for use with a magnetic disc storage system. A recording head, as used herein, is defined as a head capable of performing read and/or write operations. Antiferromagnetic coupling, as used herein, generally refers to the coupling between ferromagnetic layers or multilayer structures such that adjacent ferromagnetic layers or multilayer structures have magnetizations that point in generally opposite directions. Ferromagnetic coupling, as used herein, generally refers to indirect coupling between ferromagnetic layers or multilayer structures such that adjacent ferromagnetic layers or multilayer structures have magnetizations that point in generally the same directions.

Figure 1:
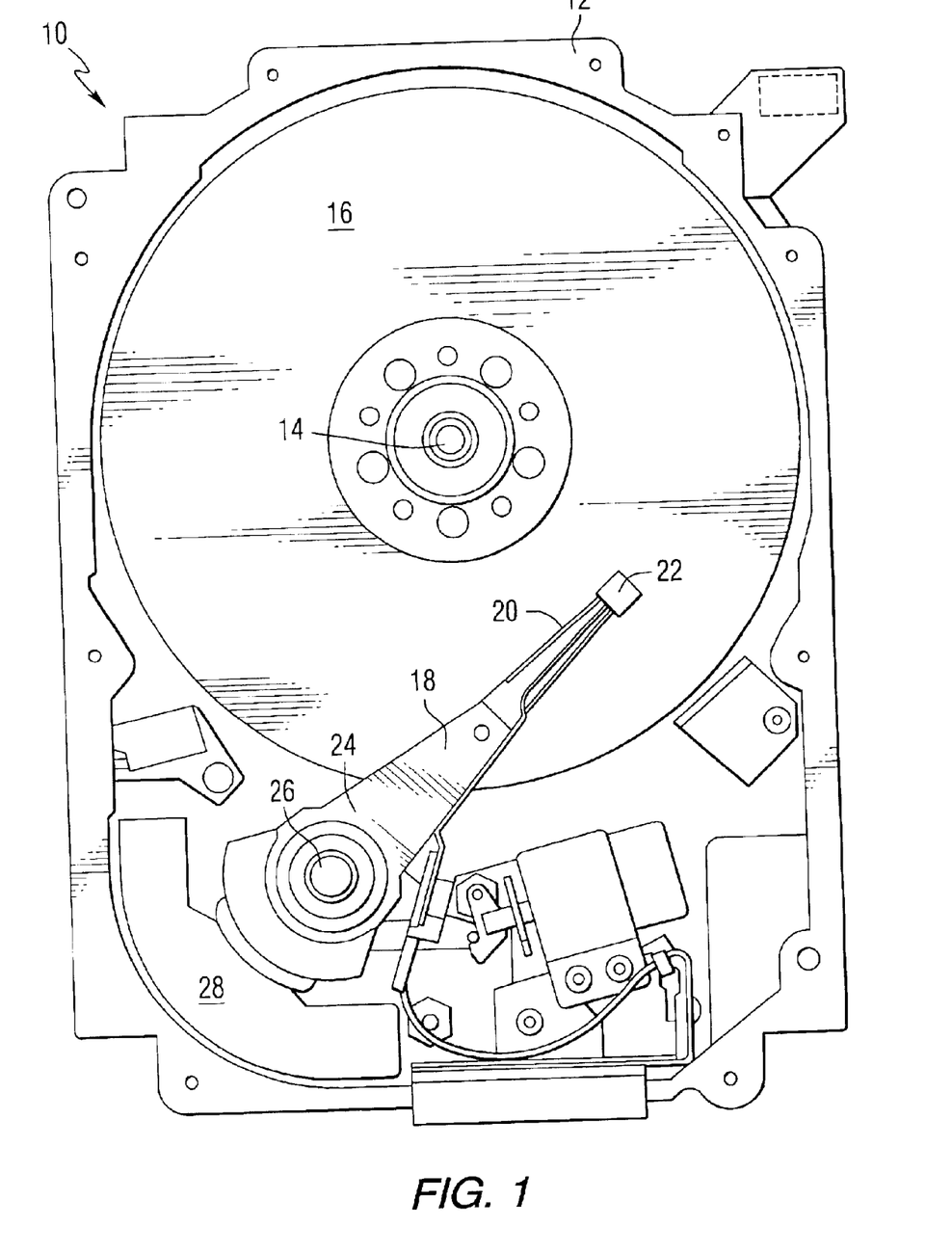
FIG. 1 is a pictorial representation of a disc drive that may utilize a perpendicular recording medium in accordance with the invention.

FIG. 1 is a pictorial representation of a disc drive 10 that can utilize a perpendicular recording medium in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be a perpendicular magnetic recording medium, within the housing, in this case a magnetic disc. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track of the disc 16. The actuator motor 28 is regulated by a controller, which is not shown in this view and is well known in the art.

Figure 2:
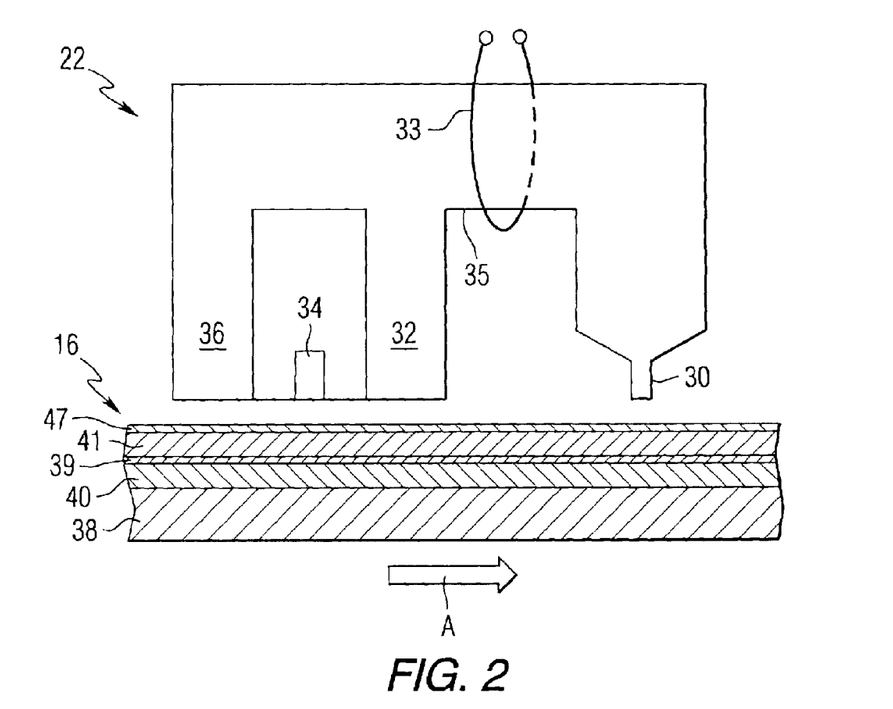
FIG. 2 is a partially schematic side view of a perpendicular magnetic recording head and a perpendicular recording magnetic medium in accordance with the invention.

FIG. 2 is a partially schematic side view of a perpendicular magnetic recording head 22 and a perpendicular recording magnetic medium 16. The recording head 22 is well known in the art and includes a writer section comprising a trailing main pole 30 and a return or opposing pole 32. A magnetizing coil 33 surrounds a yoke 35, which connects the main pole 30 and return pole 32. The recording head 22 also includes a reader section comprising a read element 34 positioned between a reader pole 36 and the opposing pole 32. The read element 34 may be a conventional GMR reader, MR reader, inductive reader, or the like. In the embodiment shown in FIG. 2, the reader section shares the opposing pole 32 of the writer section.

Still referring to FIG. 2, the perpendicular magnetic recording medium 16 is positioned under the recording head 22. The recording medium 16 travels in the direction of arrow A during recording. The recording medium 16 includes a substrate 38, which may be made of any suitable material such as ceramic glass, amorphous glass, or NiP plated AlMg. A soft magnetic underlayer 40 is deposited on the substrate 38. The soft magnetic underlayer, in accordance with the invention, is a laminated soft magnetic underlayer, which will be described in detail herein. A spacer layer 39 may be deposited on the soft magnetic underlayer 40. The spacer layer 39 may be made of any suitable material such as, for example, Cr, Ti, Ta, Ru or TiO$_2$. In addition, the spacer layer 39 may have a thickness from about 5 to about 50 angstroms. A hard magnetic recording layer 41, which in this invention is a perpendicular recording layer, is deposited on the spacer layer 39. Suitable hard magnetic materials for the hard magnetic recording layer 41 may include, for example, CoCr, FePd, FePt, CoPd, CoFePd, CoCrPt, or CoCrPd. The hard magnetic layer 41 may have a thickness from about 2 nm to about 40 nm. A protective overcoat 47, such as a diamond-like carbon, may be applied over the hard magnetic recording layer 41.

Figure 3:
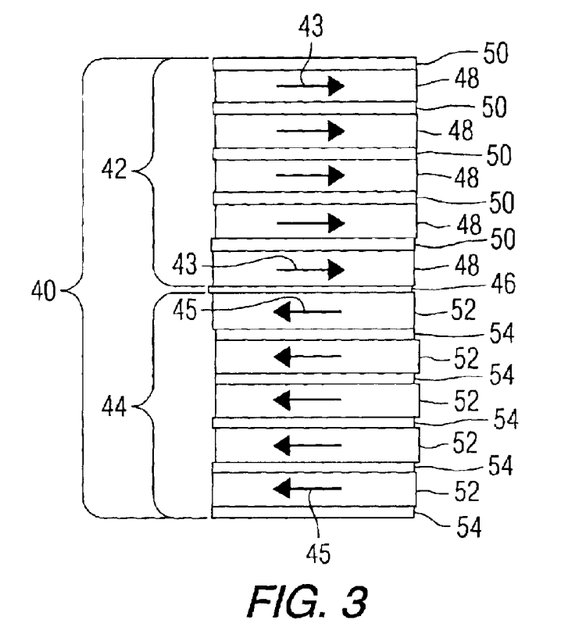
FIG. 3 is an embodiment of a soft magnetic underlayer of the invention.

Referring to FIG. 3, the soft magnetic underlayer 40 is shown in more detail. The soft magnetic underlayer 40 includes a first ferromagnetically coupled multilayer structure 42 and a second ferromagnetically coupled multilayer structure 44. A coupling layer 46 is positioned between the first and second multilayer structures 42 and 44. The coupling layer 46 antiferromagnetically couples the first and second multilayer structures 42 and 44. In accordance with the invention, and as described herein, the soft magnetic underlayer 40 results in a reduction of noise in the soft magnetic underlayer 40 and, hence, an improved signal to noise ratio (SNR). This is achieved by the creation of a primarily single domain state within the first multilayer structure 42 (as designated by arrows 43) and within the second multilayer structure 44 (as designated by arrows 45), as well as, the creation of a generally zero net remanant magnetic moment that results from the first multilayer structure 42 being antiferromagnetically coupled by the coupling layer 46 to the second multilayer structure 44.

The first ferromagnetically coupled multilayer structure 42 includes a plurality of magnetic layers 48 that are ferromagnetically coupled by a plurality of interlayers 50 positioned therebetween. Similarly, the second ferromagnetically coupled multilayer structure 44 includes a plurality of magnetic layers 52 that are ferromagnetically coupled by a plurality of interlayers 54 positioned therebetween. Selection of various parameters such as, for example, the material selection and material thickness for the magnetic layers 48 and the interlayers 50 results in the ferromagnetic coupling of the magnetic layers 48 to form the first ferromagnetically coupled multilayer structure 42. Similarly, various parameters such as, for example, material selection and material thickness of the magnetic layers 52 and the interlayers 54 results in the ferromagnetic coupling of the magnetic layers 52 for the formation of the second ferromagnetically coupled multilayer structure 44. The various parameters, such as, material selection and thickness thereof, along with the number of magnetic layers 48 and 52 and the number of interlayers 50 and 54, determine the degree of ferromagnetic coupling within each of first and second multilayer structures 42 and 44, respectively.

In addition, various parameters of the coupling layer 46 such as, for example, material selection and thickness thereof, control the degree of antiferromagnetic coupling between the first and second multilayer structures 42 and 44.

The magnetic layers 48 and 52 may comprise, for example, Permalloy, any binary or ternary alloy of Co, Fe, Ni or a Ni—Fe—Co—X alloy wherein X equals any alloying material suitable for microstructure control such as, for example, Ru, Cr, Cu, Au, Al, or Re etc. However, it will be appreciated that these materials are illustrative of materials suitable for use with the invention but other suitable materials may be used. The magnetic layers 48 and 52 may each have a thickness of from about 10 nm to about 50 nm.

The interlayers 50 and 54 may comprise, for example, Ru, Cr, Cu, $Al_2O_3$, Re, Au, or Al. However, it will be appreciated that these materials are illustrative of materials suitable for use with the invention but other suitable materials may be used. The interlayers 50 and 54 may each have a thickness from about 0.5 nm to about 5 nm.

The coupling layer 46 may include, for example, Ru, Cr, Cu, $Al_2O_3$ or Re. However, it will be appreciated that these materials are illustrative of materials suitable for use with the invention but other suitable materials may be used. The coupling layer 46 may have a thickness of from about 0.5 nm to about 5.0 nm.

In accordance with the invention, the soft underlayer 40, and particularly the first and second multilayer structures 42 and 44, exhibit many suitable properties for forming a soft underlayer. For example, they exhibit a ratio of saturation magnetization to saturation magnetic field that is tunable, primarily because the latter is a function of the interlayer 50 and 54 thicknesses and of the band structure matching between the layers 48 and 52 and the interlayers 50 and 54. Advantageously, this allows for optimization of side reading and/or writing and enhancement of the SNR. Another advantage is that the multilayer structures 42 and 44 of the soft underlayer 40 can exhibit a primarily single domain state. In addition, the soft underlayer 40 can exhibit reduced magnetostatic interaction with the hard magnetic recording layer 44, therefore, having magnetic properties that are independent of the recording signals. The parameters of the soft underlayer 40 and the multilayer configuration that make up the soft underlayer 40 that can be varied to reduce the magnetostatic interaction with the hard magnetic recording layer 44 to reduce noise levels, and to optimize the writing and reading processes are, for example, the thicknesses of the ferromagnetic layers 48 and 52 and the interlayers 50 and 54 and the thickness of the coupling layer 46. In addition, the material selection for the layers 48 and 52, the interlayers 50 and 54, and the coupling layer 46 may be varied in accordance with the invention to achieve the desired results. Other parameters that may be varied include the number and combination of the magnetic layers 48 and 52 and the interlayers 50 and 54, the ferromagnetic layer saturation magnetization, $4 \pi M_s$, and the ratio of $4 \pi M_s/H_s$.

Figure 4:
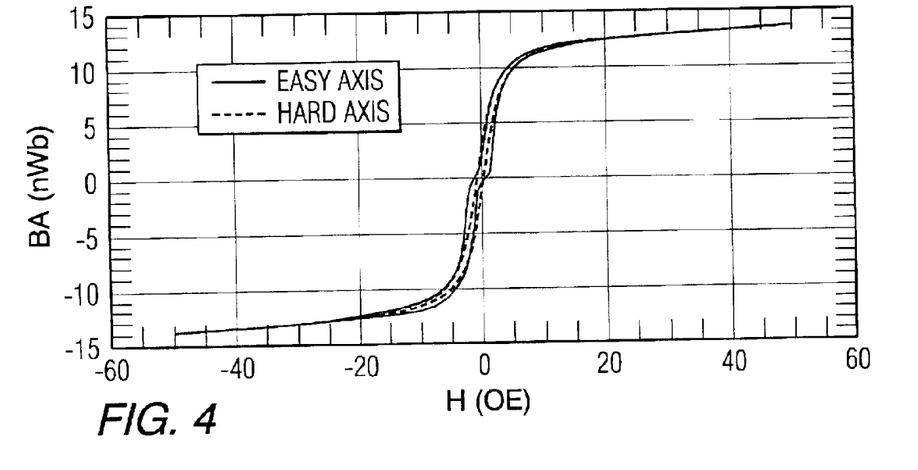
FIG. 4 illustrates a B–H curve of the soft magnetic underlayer illustrated in FIG. 3.

FIG. 4 illustrates the B–H curves of a multilayer stack constructed in accordance with the invention to form the soft magnetic underlayer 40. Specifically, the soft underlayer 40 may be constructed as follows: ($Ni_{80}Fe_{20}$ 20 nm/Ru 1.5 nm)×5/Ru 0.5 nm/($Ni_{80}Fe_{20}$ 20 nm/Ru 1.5 nm)×5. The layers $Ni_{80}Fe_{20}$ 20 nm/Ru 1.5 nm/$Ni_{80}Fe_{20}$ 20 nm, which corresponds, for example, to magnetic layer 48/interlayer 50/magnetic layer 48, are ferromagnetically coupled through RKKY interaction. The layers $Ni_{80}Fe_{20}$ 20 nm/Ru 0.5 nm/$Ni_{80}Fe_{20}$ 20 nm, which corresponds, for example, to magnetic layer 48/coupling layer 46/magnetic layer 52, are antiferromagnetically coupled through RKKY interaction. FIG. 4 illustrates that the described soft underlayer structure 40 has a near zero net remanent magnetic moment due to an antiparallel magnetic configuration between the magnetic layers 48 and between the magnetic layers 52 that form the first and second multilayers structures 42 and 44 respectively. Moreover, the magnetization curves indicate very small hysteresis, in accordance with the fact that a single-domain state was stabilized.

Figure 5:
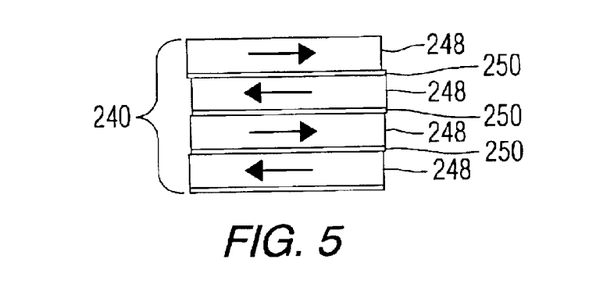
FIG. 5 illustrates an additional embodiment of a soft magnetic underlayer of the invention.

FIG. 5 illustrates another embodiment of the invention. In this embodiment, adjacent magnetic layers are antiferromagnetically coupled throughout the film thickness. Specifically, the embodiment includes a soft magnetic underlayer 240 that may serve in place of, for example, the soft magnetic underlayer 40 as described herein. The soft underlayer 240 includes a plurality of magnetic layers, such as magnetic layers 248, and a plurality of interlayers, such as interlayers 250, that are interposed between the magnetic layers 248. The interlayers 250 antiferromagnetically couple each successive pair of magnetic layers 248. Similar to the description set forth herein regarding the advantages and varying of parameters for the soft underlayers 40 and 140, the soft underlayer 240, and specifically the magnetic layers 248 and interlayers 250, may be similarly arranged. For example, to provide for the desired antiferromagnetic coupling between the magnetic layers 248, the material and thickness thereof for the magnetic layers 248 and interlayers 250 may be varied to reduce, for example, magnetostatic interaction with the hard magnetic recording layer, such as hard recording layer 44, reduce noise and optimize the writing and reading processes.

Figure 6:
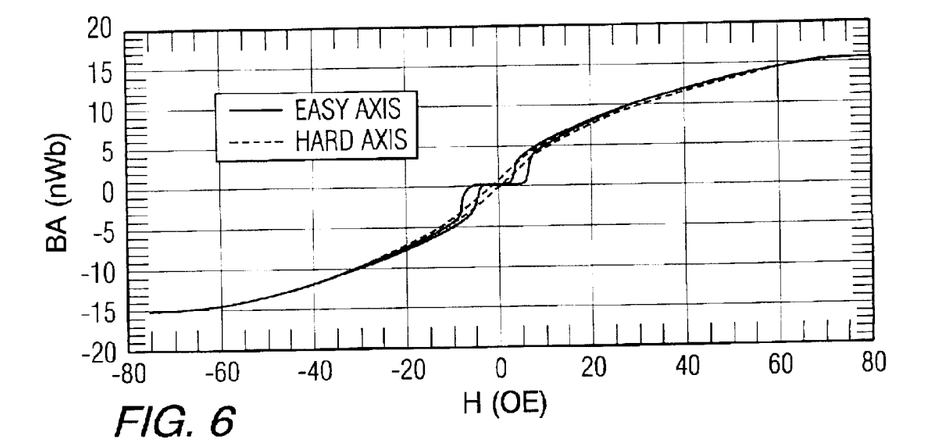
FIG. 6 illustrates a B–H curve of the soft magnetic underlayer illustrated in FIG. 5.

FIG. 6 illustrates the B–H curves of a multilayer stack constructed in accordance with the invention to form the soft magnetic underlayer 240, as illustrated in FIG. 5. Specifically, the soft underlayer 240 may be constructed as follows: ($Ni_{80}Fe_{20}$ 50 nm/Ru 0.6 nm)×4. This structure corresponds, for example, to (magnetic layer 248/interlayer 250)×4, which are antiferromagnetically coupled. FIG. 6 illustrates that the described soft underlayer structure 240 has a near zero net remanent magnetic moment due to an antiparallel magnetic configuration between the magnetic layers 248 and the interlayers 250.

To illustrate the invention, comparative investigations were performed between a single layer film formed of, for example, Permalloy $Ni_{80}Fe_{20}$, and a multilayer structure formed of, for example, $Ni_{80}Fe_{20}$/Ru multilayers. Aspects illustrated by the experimental investigation, as will be described herein, were carried out using magnetization and anisotropic magnetoresistance measurements, magnetic force microscopy (MFM) and spin stand tests.

Referring to FIGS. 7, 8, 9a and 9b, a multilayer structure with, for example, the physical structure similar to that previously described in FIG. 3 to form the soft underlayer is compared to a single layer film of Permalloy ($Ni_{80}Fe_{20}$) with a thickness of 200 nm. Both the multilayer structure and the single layer film were deposited on the structure: Ta 5 nm/(CoCr/Pd)×N/Ta/glass ceramic disc substrate, with N=16.

Figure 7:
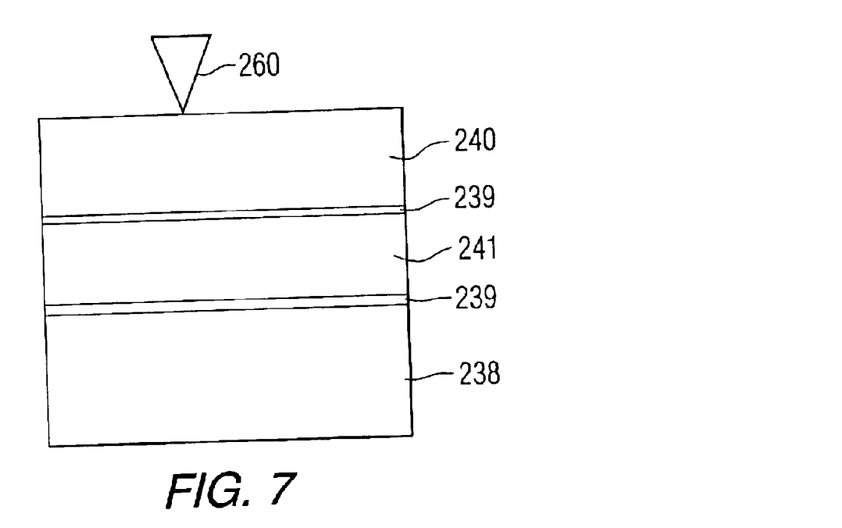
FIG. 7 is a schematic of a glass disc with hard magnetic layer, interlayer, and soft magnetic underlayer and a magnetic force microscopy tip.
Figure 8:
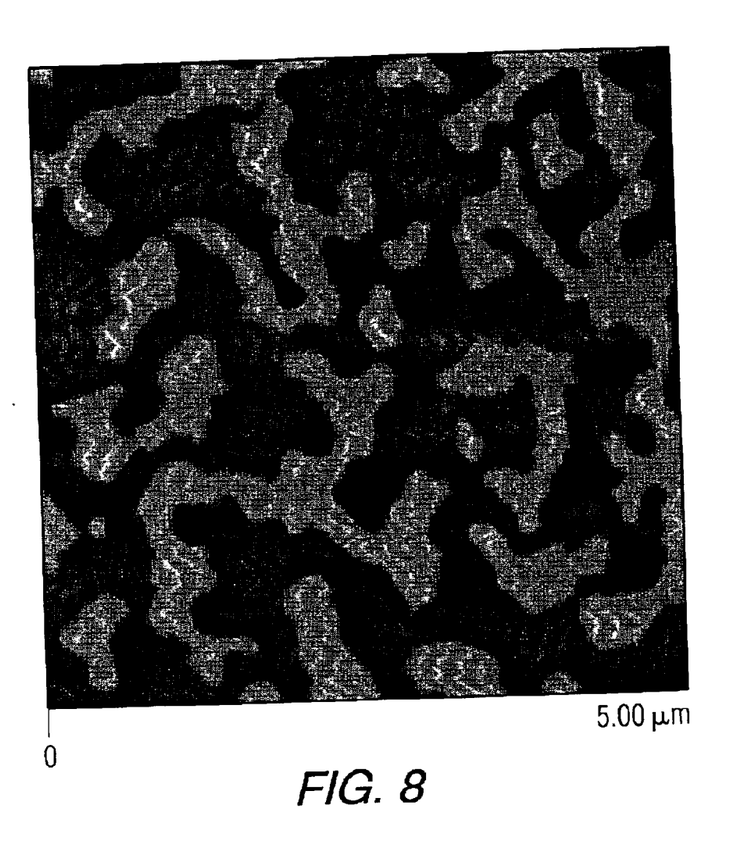
FIG. 8 is a magnetic force microscopy (MFM) image of an AC erased hard layer on a ceramic glass substrate.

FIG. 7 illustrates a schematic of a ceramic glass disc substrate 238 with a hard layer 241, interlayer 239, and soft underlayer 240 such as those prepared for MFM imaging using an MFM tip 260. A hard magnetic film, e.g. hard layer 241, with perpendicular anisotropy and highly exchanged coupled grains, characterized by a nucleation field approximately equal to a coercive force with a value of 4.5 kOe and a squareness=1, was AC erased with a Kerr-polar looper. An MFM imaging of the AC erased layer on a ceramic glass substrate is presented in FIG. 8. The AC erased film with perpendicular anisotropy shows large magnetic clusters having up and down magnetic distributions (as represented by the relatively large areas of light and dark regions or magnetic contrast shown in FIG. 8) such that only local fields are present but the net magnetic field is zero.

Figure 9A:
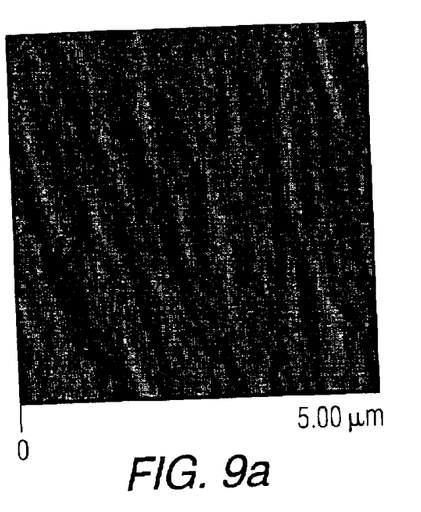
FIG. 9a is an MFM image of a soft magnetic underlayer spaced apart from an AC erased vertically oriented hard layer medium by a Ta layer with a thickness of approximately 5 nm, where the soft layer illustrated in FIG. 9a includes a Permalloy (NiFe) film with a thickness of 200 nm.
Figure 9B:
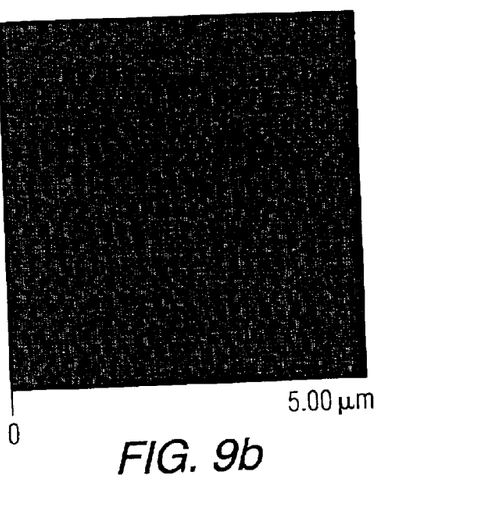
FIG. 9b is an MFM image of a soft magnetic underlayer spaced apart from an AC erased vertically oriented hard layer medium by a Ta layer with a thickness of approximately 5 nm, where the soft layer includes (Ni$_{80}$Fe$_{20}$ 20 nm/Ru 1.5 nm)×5/Ru 0.5 nm/(Ni$_{80}$Fe$_{20}$ 20 nm/Ru 1.5 nm)× 5.

Soft underlayers were then deposited on the AC erased media and the magnetic states were imaged by MFM. While single films of Permalloy exhibited multidomain states (as represented by the variation of magnetic contrast shown in FIG. 9a), the antiferromagnetically coupled multilayers exhibited a considerably lower density of domain walls (as represented by the reduced or more uniform magnetic contrast shown in FIG. 9b as compared to FIG. 9a) as shown by the MFM images presented in FIGS. 9a and 9b. Specifically, FIGS. 9a and 9b illustrate MFM images of soft layers, spaced apart from an AC erased vertically oriented hard layer medium by a Ta layer with a thickness of approximately 5 nm, wherein FIG. 9a has a soft layer of $Ni_{80}Fe_{20}$ 200 nm and FIG. 9b has a soft layer of ($Ni_{80}Fe_{20}$ 20 nm/Ru 1.5 nm)×5/Ru 0.5 nm/($Ni_{80}Fe_{20}$ 20 nm/Ru 1.5 nm)×5.

Figure 10:
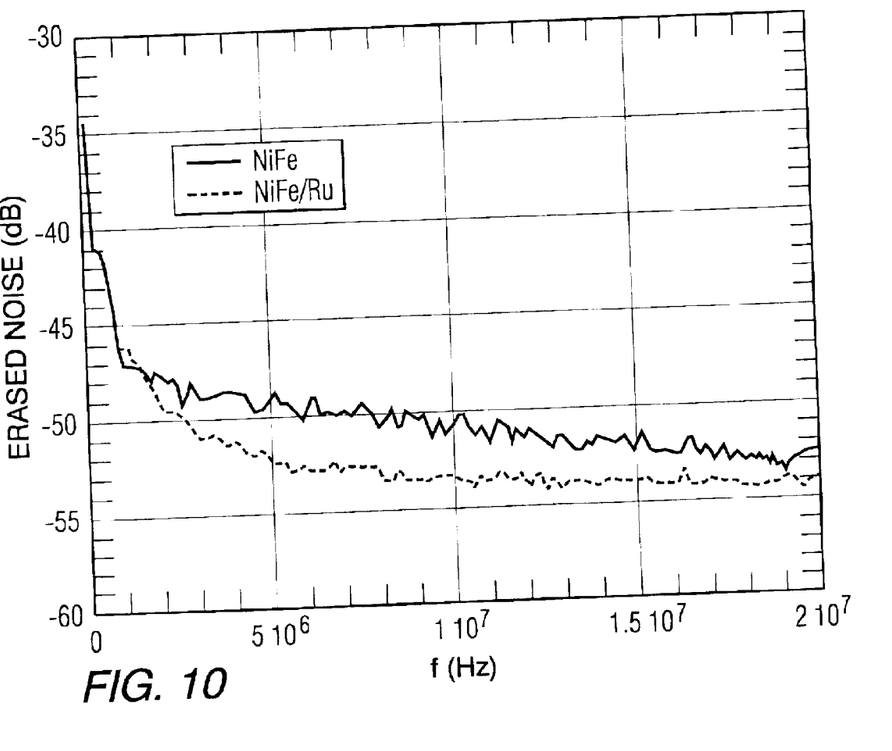
FIG. 10 compares spin stand test noise results for a single film of Permalloy with a thickness of 200 nm and a multilayer film of NiFe/Ru constructed in accordance with the invention.

FIG. 10 compares spin stand test results of AC erased noise as a function of the frequency on dual layer perpendicular media discs, using each a single layer of NiFe and a NiFe/Ru multilayer film. Specifically, the tests were carried out with a dual layer perpendicular media on ceramic glass discs, using each a hard layer of (Co, Cr/Pd)×N, separated by 10 nm of Ta from a soft underlayer of $Ni_{80}Fe_{20}$ 200 nm and of ($Ni_{80}Fe_{20}$ 20 nm/Ru 1.5 nm)×5/Ru 0.5 nm/($Ni_{80}Fe_{20}$ 20 nm/Ru 1.5 nm)×5. The experimental values of AC erased noise, obtained with a spin stand test, as illustrated, correlate with the results obtained by MFM. The dual layer disc that used a soft underlayer consisting of NiFe/Ru multilayer film exhibited considerably lower noise than that using a single layer of Permalloy.

The invention also includes a method of making a magnetically soft underlayer of a perpendicular magnetic recording medium. For example, a method for making the soft underlayer 40 (shown in FIG. 3) includes depositing a first ferromagnetically coupled multilayer structure, such as multilayer structure 44, on a substrate. The method also includes depositing a coupling layer 46 on the multilayer structure 44 and depositing an additional ferromagetically coupled multilayer structure such as multilayer structure 42, on the coupling layer 46. This results in a soft underlayer where the coupling layer 46 antiferromagnetically couples the multilayer structures 42 and 44.

More specifically, the depositing of the multilayer structure layer 44 on the substrate may include depositing an interlayer, such as interlayer 54, on the substrate followed by depositing a magnetic layer, such as magnetic layer 52, on the interlayer 54. Additional magnetic layers and interlayers may be deposited to form the multilayer structure 44. In addition, the depositing of the multilayer structure 42 on the coupling layer 46 may include depositing a magnetic layer, such as magnetic layer 48, on the coupling layer 46 and depositing an interlayer, such as interlayer 50, on the magnetic layer 48. Additional magnetic layers and interlayers may also be deposited thereon to form the multilayer structure 42. In order to obtain the described antiferromagnetically coupled multilayer structures with suitable properties that provide, for example, reduced noise and optimize reading and writing as described herein, the multilayer structures 42 and 44, and more specifically the magnetic layers 48 and 52, interlayers 50 and 54, and coupling layer 46, may vary the materials and thicknesses as described herein in various arrangements.

The depositing of layers may be done using, for example, ion-beam or sputtering or other known deposition techniques.

Whereas particular embodiments of the invention have been described herein for the purpose of illustrating the invention and not for purpose of limiting the same, it will be appreciated by those of ordinary skill in the art that numerous variations of the details, materials, and arrangements of parts may be made within the principle and scope of the invention without departing from the invention as described herein and in the appended claims.

What is claimed is:

1. A perpendicular magnetic recording medium, comprising:
   a hard magnetic recording layer; and
   a soft magnetic underlayer under the hard magnetic recording layer, wherein the soft magnetic underlayer comprises:
   a first ferromagnetically coupled multilayer structure, wherein said first ferromagnetically coupled multilayer structure includes first and second magnetic layers that are ferromagnetically coupled by an interlayer positioned therebetween;

a second ferromagnetically coupled multilayer structure; and a coupling layer positioned between said first and second ferromagnetically coupled multilayer structures, said coupling layer antiferromagnetically coupling said first and second ferromagnetically coupled multilayer structures.

2. The recording medium of claim 1, wherein said first and second magnetic layers each have a thickness of from about 10 nm to about 50 nm.

3. The recording medium of claim 1, wherein said interlayer comprises at least one material selected from Ru, Cr, Cu, $Al_2O_3$, Re, Au, and Al.

4. The recording medium of claim 1, wherein said interlayer has a thickness of from about 0.5 nm to about 5 nm.

5. The recording medium of claim 1, wherein said first ferromagnetically coupled multilayer structure includes a third magnetic layer that is ferromagnetically coupled by an additional interlayer to said second magnetic layer.

6. The recording medium of claim 1, wherein said coupling layer comprises at least one material selected from Ru, Cr, Cu, $Al_2O_3$ and Re.

7. The recording medium of claim 1, wherein said coupling layer has a thickness of from about 0.5 nm to about 5.0 nm.

8. The recording medium of claim 1, wherein said second ferromagnetically coupled multilayer structure includes first and second magnetic layers that are ferromagnetically coupled by an interlayer positioned therebetween.

9. The recording medium of claim 8, wherein said first and second magnetic layers each have a thickness of from about 10 nm to about 50 nm.

10. The recording medium of claim 8, wherein said interlayer comprises at least one material selected from Ru, Cr, Cu, $Al_2O_3$, Re, Au and Al.

11. The recording medium of claim 8, wherein said interlayer has a thickness of from about 0.5 nm to about 5 nm.

12. The recording medium of claim 8, wherein said second ferromagnetically coupled multilayer structure includes a third magnetic layer that is ferromagnetically coupled by an additional interlayer to said second magnetic layer.

13. A magnetic disc drive storage system, comprising:

a housing;

a perpendicular magnetic recording medium positioned in said housing;

a movable recording head mounted in said housing adjacent said perpendicular magnetic recording medium; and said perpendicular magnetic recording medium comprising a hard magnetic recording layer and a soft magnetic underlayer under the hard magnetic recording layer, wherein the soft magnetic underlayer comprises:

a first ferromagnetically coupled multilayer structure, wherein said first ferromagnetically coupled multilayer structure includes first and second magnetic layers that are ferromagnetically coupled by an interlayer positioned therebetween;

a second ferromagnetically coupled multilayer structure; and a coupling layer positioned between said first and second ferromagnetically coupled multilayer structures, said coupling layer antiferromagnetically coupling said first and second ferromagnetically coupled multilayer structures.

14. A method of making a laminated magnetically soft underlayer of a perpendicular magnetic recording medium, comprising:

depositing a first ferromagnetically coupled multilayer structure on a substrate, depositing said first ferromagnetically coupled multilayer structure comprising:

depositing an interlayer on the substrate;

depositing a magnetic layer on the interlayer;

depositing an additional interlayer on the magnetic layer: and depositing an additional magnetic layer on the additional interlayer;

depositing a coupling layer on said first ferromagnetically coupled multilayer structure; and depositing a second ferromagnetically coupled multilayer structure on said coupling layer, wherein said coupling layer antiferromagnetically couples said first and second ferromagnetically coupled multilayer structures.

15. The method of claim 14, including forming the magnetic layer and additional magnetic layer to each have a thickness of from about 10 nm to about 50 nm.

16. The method of claim 14, wherein said step of depositing a second ferromagnetically coupled multilayer structure on the coupling layer comprises;

depositing a magnetic layer on the coupling layer;

depositing an interlayer on the magnetic layer;

depositing an additional magnetic layer on the interlayer; and depositing an additional interlayer on the additional magnetic layer.

17. The method of claim 16, including forming the magnetic layer and additional magnetic layer to each have a thickness of from about 10 nm to about 50 nm.

* * * * *